Figure 4:
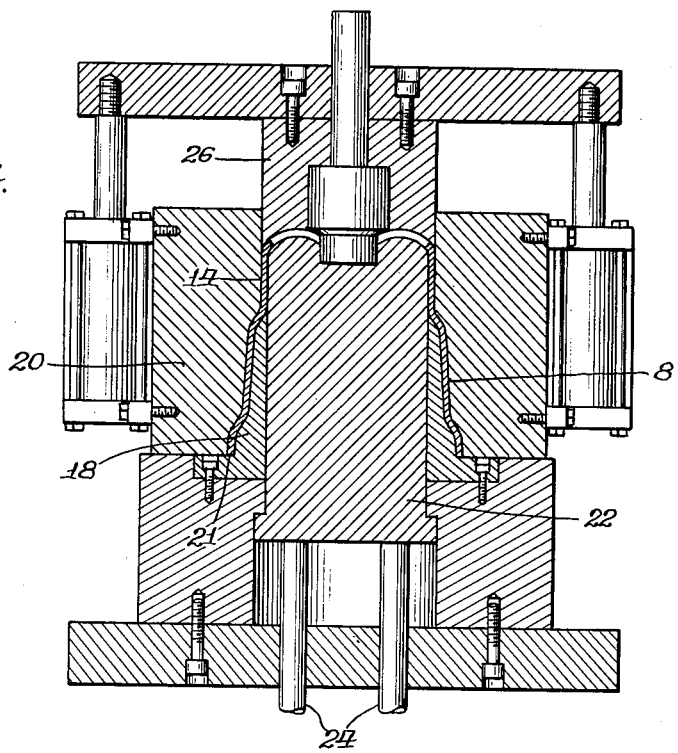

April 21, 1964 D. S. COX 3,129,505
PROCESS OF MANUFACTURING ONE PIECE BRAKE DRUM SHELLS
Filed May 9, 1961 6 Sheets-Sheet 1
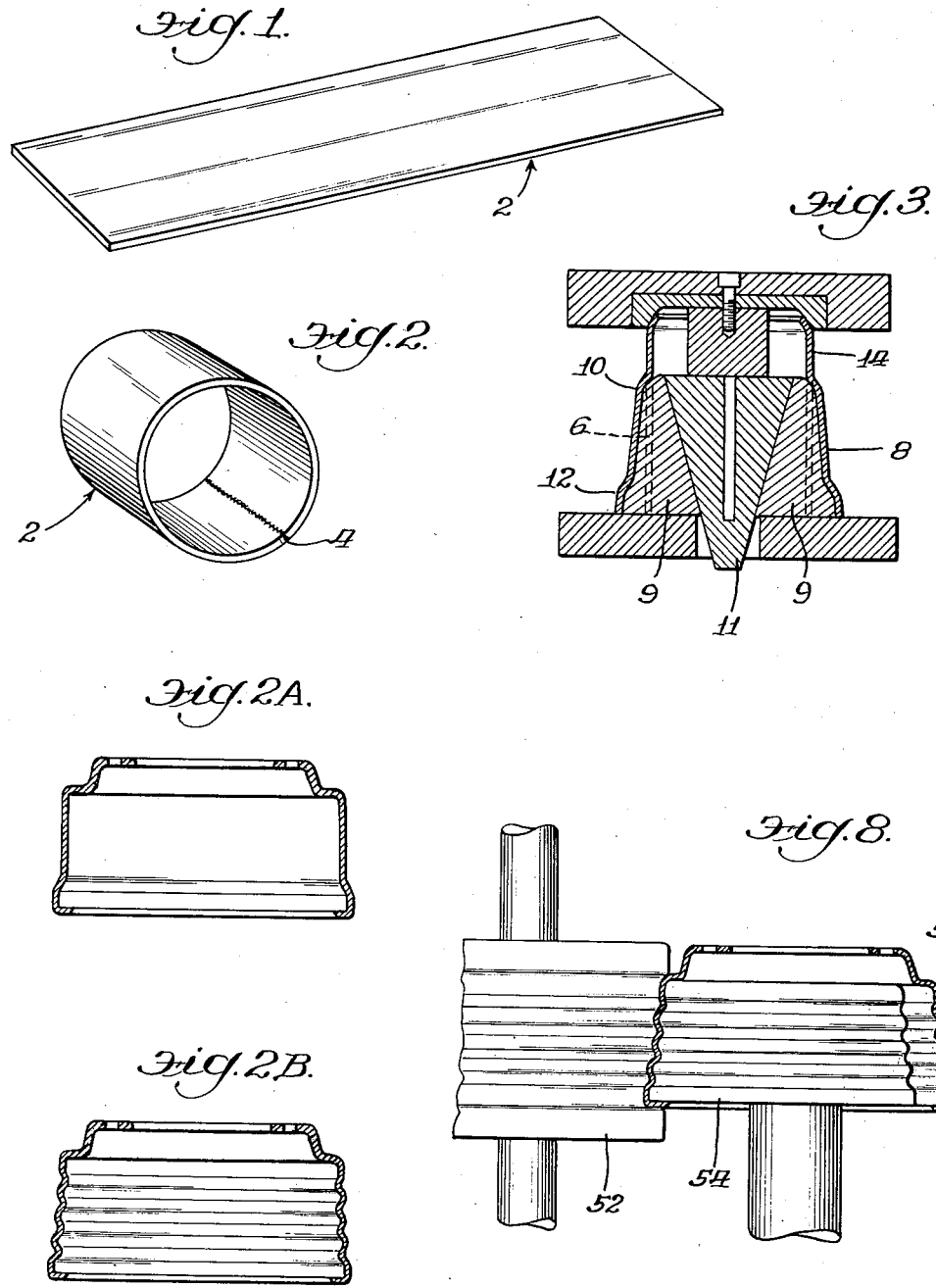
INVENTOR.
Darwin S. Cox
BY April 21, 1964    D. S. COX    3,129,505
PROCESS OF MANUFACTURING ONE PIECE BRAKE DRUM SHELLS
Filed May 9, 1961    6 Sheets-Sheet 2

INVENTOR.
Darwin S. Cox
BY
Atty.

INVENTOR.
Darwin S. Cox

April 21, 1964 D. S. COX 3,129,505
PROCESS OF MANUFACTURING ONE PIECE BRAKE DRUM SHELLS
Filed May 9, 1961 6 Sheets-Sheet 4

INVENTOR.
Darwin S. Cox
BY
Neil J. Duvall
Atty.

April 21, 1964 D. S. COX 3,129,505
PROCESS OF MANUFACTURING ONE PIECE BRAKE DRUM SHELLS
Filed May 9, 1961 6 Sheets-Sheet 5

INVENTOR.
Darwin S. Cox
BY
Atty.

April 21, 1964 D. S. COX 3,129,505
PROCESS OF MANUFACTURING ONE PIECE BRAKE DRUM SHELLS
Filed May 9, 1961 6 Sheets-Sheet 6
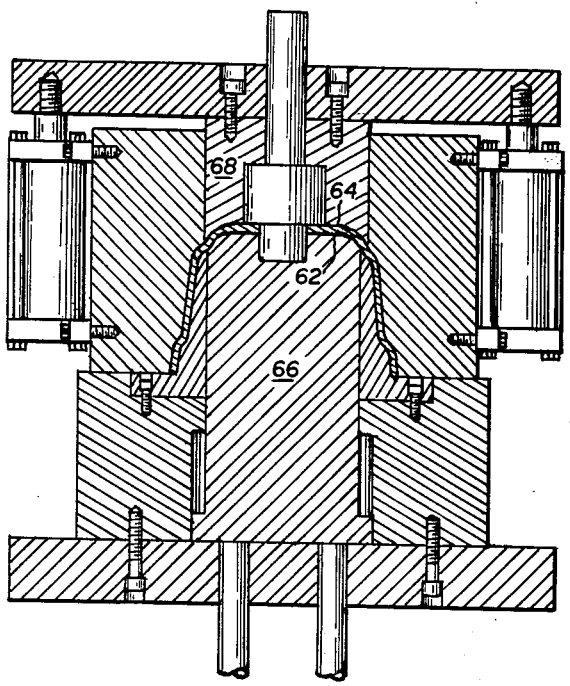
FIG. 11
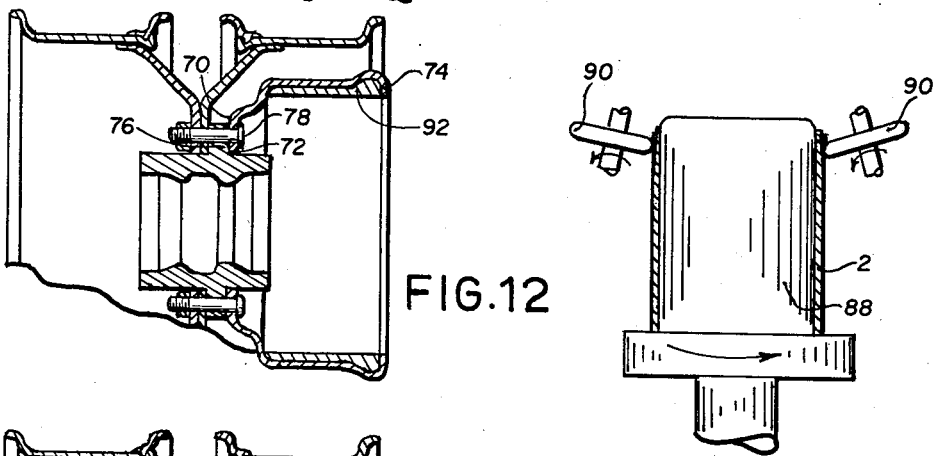
FIG. 12
FIG. 14
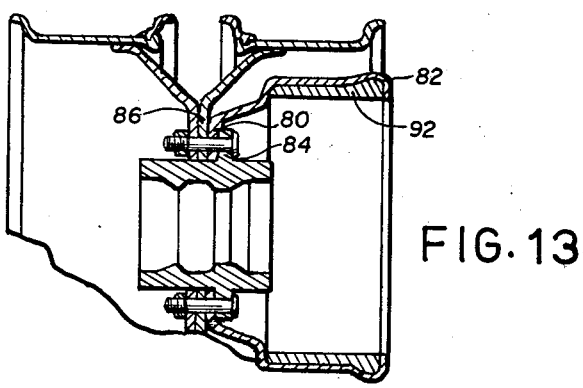
FIG. 13
INVENTOR.
BY Darwin S. Cox

United States Patent Office 3,129,505
Patented Apr. 21, 1964

3,129,505
PROCESS OF MANUFACTURING ONE PIECE
BRAKE DRUM SHELLS
Darwin S. Cox, 10712 S. Bell Ave., Chicago 43, Ill.
Filed May 9, 1961, Ser. No. 110,303
6 Claims. (Cl. 29—534)

The invention relates to a method of manufacturing brake drum shells, and particularly to a method of such manufacture wherein both the rim or drum section and hub section are made from a unitary cylindrical blank.

This application is a continuation in part of application Serial No. 822,008, now abandoned, filed in my name June 22, 1959.

Those familiar with the art of brake drum shell manufacture, from steel plate, as currently commercially practiced, will know that such articles are manufactured in two separate pieces—that is, a central or hub mounting section is blanked from one plate, resulting in considerable waste, as the large center hole and corners of the original plate are discarded as scrap. Frequently, more than 30% of the original plate is so scrapped. The cylindrical outer section is made separately from another piece of material. The two parts are trimmed or formed to complementally relate to each other, and then welded together to provide the complete drum into which the brake drum lining is cast.

Accordingly, it is an object of the present invention to provide a process of manufacture of the article here under consideration of unitary form and out of a single piece of stock.

It is also an object of the present invention to provide such a process of manufacture that will result in the elimination of wasted raw material and to further decrease cost of manufacturing by a reduction in the operations required to produce the finished article.

Specifically, the invention comprehends providing a rectangular strip of uniformly thick steel plate, wrapping the plate into cylindrical form with abutting edges, welding the abutting edges, trimming the excess weld material therefrom, radially expanding in conical form a large portion of the total axial length of the cylinder, and curling inwardly almost all the remaining portion of the total axial length of the cylinder, said curling being accomplished by confining and supporting the inner and outer surfaces and lower edge of the expanded conical portion and forcing the remaining portion of the cylinder between die members having arcuately curved surfaces which are so designed to accommodate thickening of the metal while curling. A yielding pressure is maintained on the surfaces of said remaining portion during said curling to maintain same wrinkle free. Thereafter part of said inwardly curled portion is flattened into a hub substantially perpendicular to the blank axis while said conical portion is formed into a desired cylindrical section substantially parallel to said blank axis. Of course special designs of ribs or the like may be rolled or pressed into the wall of the cylindrical section as desired and the blank may be trimmed to appropriate size and provided with bolt holes etc.

Figure 4A:
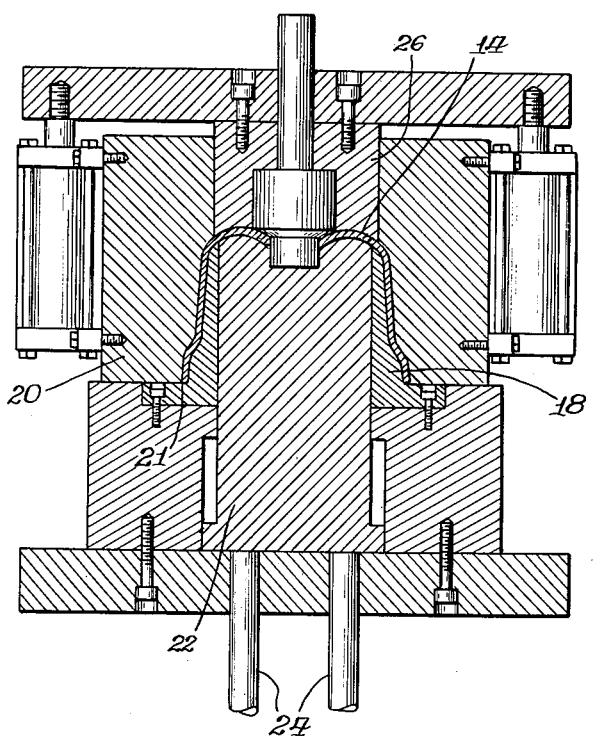
Figure 5:
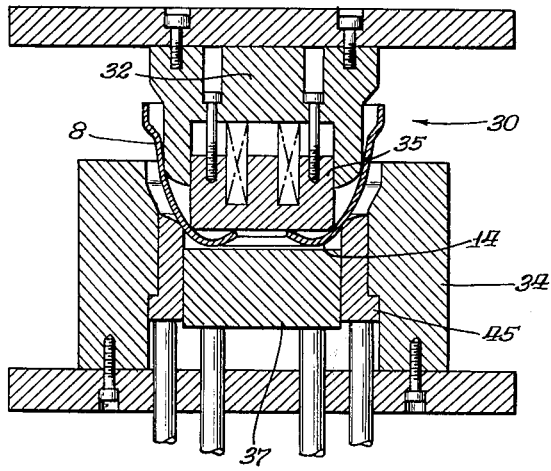
Figure 6:
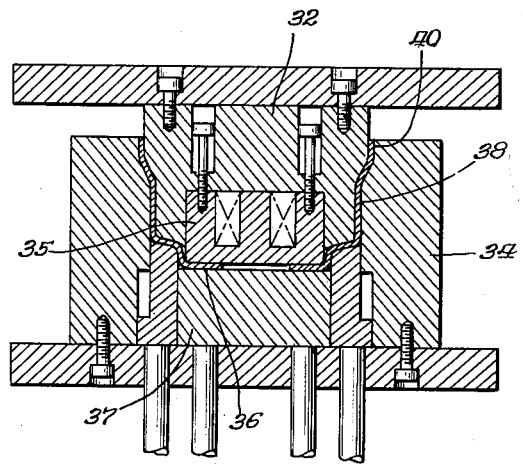
Figure 7:
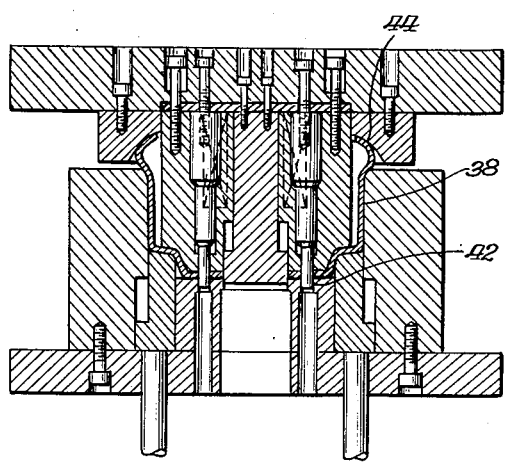
Figure 9:
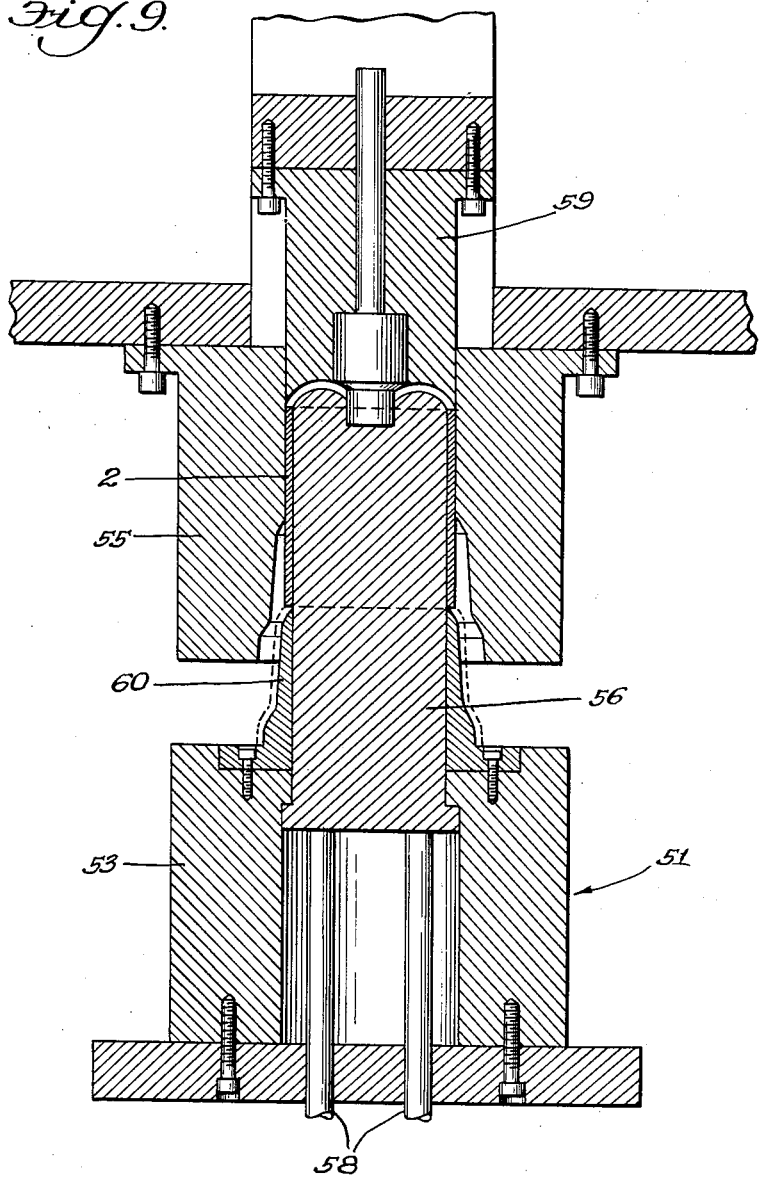
Figure 10:
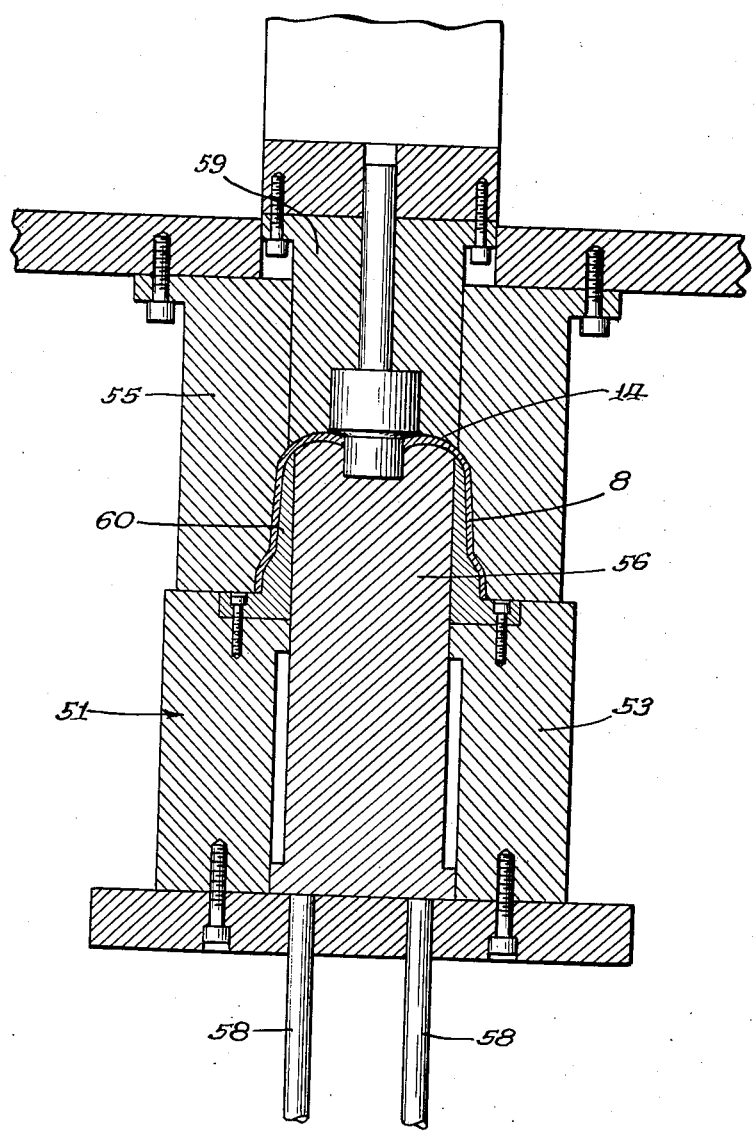

These and other objects of the invention will become apparent in the course of the following description, and from an examination of the associated drawings, wherein:

FIGURES 1 and 2 illustrates the raw material and cylindrical blank provided in the invention, FIGURES 2A and 2B illustrate typical brake drums as may be produced by the instant process, FIGURE 3 illustrates a first forming operation employed in a preferred embodiment of the invention, FIGURES 4 and 4A illustrate the next forming operation in the preferred embodiment of the invention, FIGURES 5 and 6 illustrate the next forming operation in the preferred embodiment of the invention, FIGURE 7 illustrates the final forming operation in the invention, FIGURE 8 illustrates forming a typical cross-section in the cylindrical portion of the drum, FIGURES 9 and 10 illustrate an alternate forming operation that may be employed, FIGURE 11 illustrates another alternate method of gathering the material inward similar to forming operation shown in FIGURES 4 and 4A, FIGURES 12 and 13 illustrate typical brake drum mountings to wheel hubs, FIGURE 14 illustrates a pre-tapering step which may be employed on the cylinder.

Describing the invention in detail, and directing attention initially to FIGURES 1 and 2, it will be apparent that a piece of rectangular strip stock, indicated generally at 2, is provided. The strip stock 2 is first rolled into generally cylindrical form (FIGURE 2), and its abutting edges are welded as at 4. Before further forming, it is desirable to trim any excess weld material that may appear at the abutting edges 4 and, if desired, the weld area or entire cylinder may be normalized in any conventional manner to eliminate stress build-up in the material.

Turning now to FIGURE 3, it will be noted that the original cylinder diameter is indicated by the dotted lines 6. In the initial die-forming operation, a large portion of the total axial length of the cylinder is radially expanded, as at 8, into a generally tapered conical form and it is desirable that the conical section 8 be provided with a plurality of steps 10 and 12, as illustrated. It will be noted that the upper portion of the cylinder 14 remains in substantially cylindrical form—that is, parallel to the blank axis. The die to accomplish this step comprises a plurality of movable segments 9, 9 in inclined plane engagement with a central wedge 11. As the wedge 11 is moved downwardly, the segments 9 are uniformly moved radially outwardly. If desired, this cylindrical portion 14 may also be uniformly though cylindrically expanded a small amount (not shown) merely to size the blank. This is an optional step and may be utilized to eliminate possible small dimentional discrepancies in the strip stock provided. Additionally, and if desired, the upper edge of the cylindrical portion 14 may be slightly formed as at 16 or bent inwardly to facilitate the curling taking place during subsequent die-forming operation.

Turning now to FIGURES 4 and 4A it will be seen that a die is provided having a lower male portion 18 which is complementally received in the expanded conical section 8 of the blank 2. The die is also provided with a female portion 20, which complementally receives the conical section 8 and which, together with the male portion 18, firmly confines the conical section 8 of the blank during this operation. An abutment 21 engages the lower edge of said section 8. Additionally, an independently movable segment 22 having cushion pins 24 cooperates with an upper die section 26 so that the upper portion 14 of the blank 2 is arcuately curled inwardly and thickens while yielding pressure is maintained on the inner and outer surfaces of said portion 14 being curled. As a result of the way the expanded stepped conical portion of the cylinder is supported and confined while the other end is being curled inward, and while a yielding pressure is maintained on the surfaces of the part being curled, the blank is formed to the desired configuration without wrinkles or blank distortions.

The particular combination of the expansion and curling steps illustrated enables drum shell manufacture from a cylinder of such size that the hardening due to cold working is held within limits throughout the blank generally accommodating further die forming without annealing.

Attention is now directed to FIGURES 5 and 6 which illustrate the action employed in the next forming operation. For illustrative purposes, the blank 2 is shown reversed with the curled portion 14 located centrally in the die arrangement 30 and the conical portion 8 located upwardly and outwardly of the portion 14. The die itself comprises a male die element 32 and cooperating female die element 34, each having relatively movable segments 35, 37 and 54 therein. The part 30 is illustrated in closed position in FIGURE 6, and it will noted that part of the curled portion 14 is now formed into a substantially flat, planar, hub section 36 arranged in generally perpendicular relation to the axis of the blank. Additionally, the conical section 8 is reformed into a cylindrical section 38 surrounding and generally parallel to the blank axis. An outwardly offset lip section 40 is provided at the upper extremity of the cylinder section 38 when product design requires a larger diameter in this area.

Considering FIGURE 7, it will be seen that the substantially formed brake drum is here subjected to the final step of trimming the inner annular edge of the blank, forming the bolt holes 42 and curling the peripheral lip 40 inwardly, as at 44, to provide the wanted configuration. If desired the inward curl of the lip 40 may be accomplished by a separate operation, such as for example, by rolling. Some designs may require that the cylindrical section 38 be further formed to provide the desired cross-section. An example is illustrated in FIGURE 8 where corrugations 50 may be formed under the action of rolls 52 and 54.

Attention is now directed to FIGURES 9 and 10 which illustrate a die arrangement wherein the expanding and curling steps heretofore described may be combined. The die 51 comprises a lower male part 53 and an upper female part 55. The part 53 has a central movable segment 56 which is in operative engagement via cushion pins 58 with a cushion (not shown) to provide yielding wiping action during the curling operation hereinafter described. The upper part 55 is also provided with a relatively movable segment 59. The male part 53 is provided with a sleeve 60 over which the cylinder is forced to expand.

FIGURE 9 shows the blank in position in the die arrangement 51 prior to die closure. FIGURE 10 illustrates the die 51 at the termination of the stroke with the blank 2 formed into the conical portion 8 and the curled portion 14. It will be understood by those skilled in the art that the blank 2 is formed by initially being forced radially outwardly over the sleeve 60 to form the stepped and tapered conical section 8. While this is being expanded over the sleeve the material starts to curl inward at the upper end. As it requires greater force to curl and gather the metal inwardly between the pressure yielding surfaces of the curl die members, than it does to expand the material over the sleeve the expanded portion reaches its final resting place and is confined before the completed curl is obtained.

Sequentially, therefore, the blank is radially expanded over the sleeve into the tapered stepped conical portion 8 while the first part of the curling is taking place. Before the forces of curling become great enough to cause buckles or distortion to the expanded portion the upper die segment 55 has reached its lowest position and totally confines the expanded area while the balance of the curling and thickening of the portion 14 takes place.

FIGURE 11 illustrates an alternate method of curling similar to that shown in FIGURES 4 and 4A. In FIGURE 11 the die is shown in the closed position. Here the surfaces 62 and 64 of inner die members 66 and 68 are shaped to guide the material inward and towards the center without necessarily curling beyond the 90 degree point in relation to the blank axis. This alternate method produces a substantially flattened central section and thereby further simplifies the forming in subsequent operations.

FIGURE 12 illustrates a typical assembly of a brake drum, hub and wheels. In FIGURE 12 it will be seen, the outer face 70 of the thick mounting portion 72 of the brake drum 74 is mounted against the hub flange 76 and secured by means of the bolts 78. It will be understood that, in this arrangement, the slight taper in the mounting area, which is created by the progressive gathering and thickening of the material during the curling can be easily spot faced around the bolt holes to provide uniformly flat seating areas for the bolt heads.

FIGURE 13 illustrates another typical brake drum, hub and wheel assembly arrangement wherein the thick central mounting portion 80 of the brake drum 82 is mounted between the hub flange 84 and the wheel member 86. In this type of assembly it is generally desirable to have a very uniform thickness throughout the thickened central mounting portion 80 of the brake drum. This desired uniform thickness can be obtained by various methods such as machining after the brake drum has been formed, or by machining or otherwise pre-tapering the end of the blank a determined amount before curling and gathering.

FIGURE 14 shows a preferred method of accomplishing the desired uniform thickness described and shown in FIGURE 13. In FIGURE 14 the cylinder 2 is rotated on a mandrel 88 and one or more rollers 90, 90 are guidably forced over the area of the end of the cylinder which will form the thick central mounting area after curling and gathering. The slight tapering imparted by the rollers will offset the taper which would normally occur during the progressive gathering and thickening during the inward curling. The material in this central mounting area will then become uniformly thick during said curling and gathering. This method of tapering shown in FIGURE 14 is the preferred method because it provides a taper of maximum uniformity, utilizes all the material and is much faster than machining. The material being moved by this rolling action generally causes the cylinder to grow slightly in overall length. This taper rolling can, of course, be performed on either the straight or expanded cylinder, before curling and gathering.

In the various embodiments illustrated it will be understood that the thickness of the original wall is reduced somewhat throughout the expanded area which upon final forming becomes the cylindrical drum segment. The portion which is curled inwardly becomes thicker thereby imparting greater strength to the central hub area as generally required by the product design. Thus it will be understood that the process disclosed accommodates the production of brake drum shells having the required heavier hub section at the point of mounting and the relatively thinner cylindrical section thus meeting strength and weight distribution requirements of the final brake drum.

It will also be noted that the method described accommodates the manufacture of a unitary brake drum shell from one piece of stock, thus eliminating the unnecessary waste of raw material and reducing handling and the number of manufacturing operations required in this production. A lining 92 shown in FIGURES 12 and 13 is then cast into the completed shell providing the final brake drum.

The invention as shown is by way of illustration and not limitation and may be subject to various modifications without departing from the spirit thereof or the scope of the appended claims.

What I claim is:

1. In a method of manufacturing brake drum shells, the steps of providing a rectangular plate, wrapping the plate into a cylinder having abutting edges, welding the abutting edges, trimming the weld, taper-expanding and thinning a large portion of the total blank length and inwardly curling and reducing the diameter of the remaining portion of said blank length to thicken same, said curling being accomplished by confining and firmly holding said taper-expanded portion while forcing said remaining portion inwardly between generally arcuately curved die surfaces and maintaining a yielding pressure on the portion being curled and thereafter flattening said curled portion into a substantially common plane perpendicular to the axis of the blank and forming a substantial segment of said large tapered and expanded portion into a generally cylindrical form surrounding said blank axis.

2. In a method of manufacturing one piece brake drum shells from a unitary blank, the steps of providing a cylindrical blank of determined uniform axial length and wall thickness, radially expanding and thinning one end and a substantial segment of the total blank length to a tapering conical form with the largest diameter adjacent one end, firmly holding and confining said expanded segment while progressively curling and gathering the other end and a large part of the remaining portion inwardly between pressure yielding die surfaces of determined generally arcuate design to decrease the diameter and substantially thicken the material in said remaining portion, further forming part of the inwardly gathered portion to provide a thick flat central hub area surrounding and generally perpendicular to the blank axis and reform the expanded segment to provide the desired cylindrical drum portion.

3. A method according to claim 2, wherein the radially expanding of said one end and substantial segment includes forming it into a generally stepped and outwardly tapering cone as seen in cross section.

4. A method according to claim 3, including forming an annular shoulder in said segment adjacent said portion.

5. In a method of manufacturing one piece brake drum shells from a unitary blank, the steps of providing a cylindrical blank of determined uniform axial length and wall thickness, imparting a slight taper in the wall thickness of a determined circumferential area adjacent one end, radially expanding and thinning the other end and a substantial segment of the total blank length to a generally stepped tapering conical form with the largest diameter of said expanded segment adjacent said other end, firmly holding and confining said expanded segment while progressively curling and inwardly gathering said one end between pressure yielding die surfaces of determined generally arcuate design to decrease the diameter and substantially thicken the material in said one end, further forming part of the inwardly gathered portion to provide a thick flat central hub area surrounding and generally perpendicular to the blank axis and reforming the expanded segment to provide the desired cylindrical drum portion.

6. In a method of forming brake drum shells and like metal articles the steps of providing a cylindrical blank, imparting a slight taper in the wall thickness of a determined circumferential area adjacent one end of the blank, radially expanding to enlarge the diameter and thin the wall of the other end and a substantial segment of the total blank length to a generally tapering conical form having the largest diameter of said conical form adjacent said other end and the small diameter of said conical form terminating in an outwardly formed annular shoulder in the more central portion of the blank, firmly holding and confining said expanded segment while progressively curling and inwardly gathering said one end between pressure yielding die surfaces of determined generally arcuate design to decrease the diameter and substantially thicken the material in said one end, further forming part of the inwardly gathered portion to provide a thick flat central hub area surrounding and generally perpendicular to the blank axis and reforming the expanded segment to provide the desired cylindrical drum portion.

References Cited in the file of this patent

UNITED STATES PATENTS

| | | |
|---|---|---|
| 1,760,560 | Kranz | May 27, 1930 |
| 1,931,163 | Kranz | Oct. 17, 1933 |
| 2,151,568 | Sinclair | Mar. 21, 1939 |